July 14, 1953     T. L. THORSEN     2,645,528

AIR NOZZLE DEVICE

Filed Nov. 30, 1950

INVENTOR.

THORVALD L. THORSEN

Patented July 14, 1953

2,645,528

UNITED STATES PATENT OFFICE 2,645,528

AIR NOZZLE DEVICE

Thorvald L. Thorsen, Beloit, Wis., assignor to Fairbanks, Morse & Co., Chicago, Ill., a corporation of Illinois Application November 30, 1950, Serial No. 198,360

2 Claims. (Cl. 299—140)

This invention relates to improvements in fluid discharge nozzles, and more particularly to an air nozzle device of improved construction and operation, which is especially suitable for use with a compressed air supply conduit or flexible hose to deliver a stream of air under pressure against or in and about an object or objects to be cleaned of dust, loose dirt accumulations and other matter.

While it is well known and a relatively common practice in machine shops and the like, to employ compressed air in discharge against objects and articles for removing dust, dirt, machining chips and other foreign matter from the surfaces and recesses of such articles, it will be appreciated that where the frequency of air cleaning is relatively great, or the number of objects to be cleaned in a given period is large, the cost of supplying and maintaining the supply of compressed air in volume adequate for the purpose, presents an economic problem of considerable importance. Moreover, where the compressed air supply is such as to afford an air stream discharge under comparatively high pressure and a high rate of flow, the impingement of the jet against the object to be cleaned normally results in a relatively wide dispersion or scattering of the dirt, chips and other foreign matter thus blasted from the object. Such scattering, particularly of machining chips and the like, constitutes a very real source of possible injury to the manipulator of the cleaning jet, as well as to others who may be in the immediate vicinity of the cleaning operation.

Accordingly, the principal object of the present invention is to provide, for use with compressed air cleaning apparatus, an improved air discharge nozzle device adapted for producing an increased volume of air discharge at a pressure less than the pressure of the compressed air supply, as effected through the addition of atmospheric air to the issuing compressed air stream, whereby to provide for effective cleaning without excessive scattering of dust, machining chips, dirt and the like, and to effect a material saving in the consumption of compressed air.

Pursuant to the foregoing objective, the present invention affords a nozzle device for operative association with the discharge end of a compressed air supply conduit or flexible hose, comprising a nozzle attachment member supporting a conical nozzle and provided with a tubular element or pipe section projecting therefrom centrally within the nozzle, the tubular element supplying compressed air from the supply conduit to the nozzle. Formed in the attachment member are a plurality of passages arranged in an annular series about the tubular element, the passages preferably being equally spaced in the series and each inclined toward the discharge tip of the nozzle preferably such that its axis in projection intersects the axis of the tubular element adjacent the open discharge end of the latter element. The passages are open to atmosphere through the open rear end of the nozzle, so that upon discharge of compressed air from the tubular element, the compressed air stream will aspirate or draw-in atmospheric air through the passages for mixture with and entrainment in the compressed air stream. Consequently, the air stream issuing from the nozzle will be of increased volume by reason of the added atmospheric air, but at a pressure below the pressure of the compressed air in discharge through the tubular element of the nozzle device. Moreover, the opening at the discharge tip of the nozzle has an area appreciably greater than that of the discharge end of the tubular element, so that the final air stream issuing from the nozzle device will present a desirably large frontal area for sweep impingement upon the surfaces or areas of the objects to be cleaned. It will be appreciated then, that due in great part to the increased volume of the cleaning air stream as attained by the aspirated addition of atmospheric air, and the increased frontal area of the stream issuing from the nozzle device, effective cleaning may be accomplished with a materially reduced rate of compressed air consumption. Thus the presently improved nozzle affords an expedient for effecting a more economic use of compressed air in a cleaning system of the character indicated, while providing for effective cleaning with lowered stream pressures and less scattering of the removed dirt.

Other and further features, objects and advantages of the present invention will be apparent to one skilled in the art from the following detailed description taken in connection with the accompanying drawings. On the drawings as shown:

Figure 1:
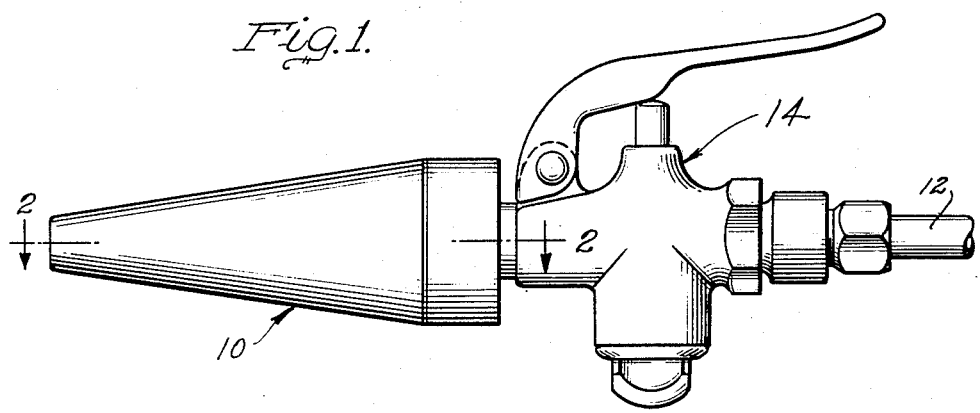
Figure 1 is a side elevational view of a nozzle constructed according to the teachings of the present invention, the nozzle being shown attached to the valved end of a compressed air line.

With reference to the drawings, in Figure 1 the reference numeral 10 indicates generally an air nozzle device which is connected to a conduit 12 leading from a source of compressed air (not shown), the line including a standard manually-operated air control valve 14.

Figures 2, 3:
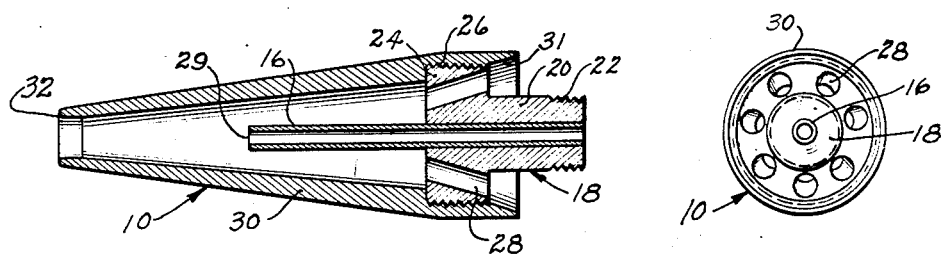
Figure 2 is a horizontal sectional view taken on line 2—2 of Figure 1.
Figure 3 is an end elevational view of the nozzle of the present invention.

The nozzle device 10 comprises a rigid tubular element or pipe section 16, Figure 2, secured, as by a press fit, in a nozzle support or attachment member 18. The member 18 has a shank portion 20 with an externally threaded end 22 for threaded attachment to the valve 14, and a body portion 24 of enlarged diameter disposed forwardly of the shank 20. The body portion 24 has a peripheral threaded area 26 and a plurality of slanted passages 28 disposed radially inwardly of the threaded periphery. These passages are inclined forwardly and radially inwardly toward the axis of the pipe section 16, preferably such that the axis of each passage intersects the axis of the pipe section adjacent the open discharge end 29 of the pipe.

A nozzle 30 is internally threaded near its rear open end 31 for engagement on the threaded periphery of the member 18. The nozzle is hollow and has a frusto-conical configuration, with its larger end 31 disposed over the threaded support member, and its smaller end forming a discharge orifice 32.

As best seen in Figure 2, the pipe section 16 extends approximately half way into the nozzle 30. When the nozzle is attached to the air line, compressed air is delivered from line 12 to the pipe section 16 under control by the valve 14. Consequently, upon passage of air under pressure through the pipe 16 and then through the forward end orifice 32 of the nozzle, the compressed air stream draws atmospheric air into the nozzle through the slanted passages 28 by an aspirating or suction action. Thus, the air from the pipe section is increased in volume by the atmospheric air. The increased volume of air plus the intermingling of the air streams results in a nozzle discharge at a pressure much less than the stream pressure would be if the pipe section 16 were used alone, as is common practice at present.

Moreover, since the area of the nozzle discharge orifice 32 is very appreciably greater than the area of the pipe section orifice 29, the air stream issuing from the nozzle device will have a desirably large frontal area for sweep impingement upon the surfaces or areas of the objects to be cleaned. It should be now readily appreciated that in consequence of the increased frontal area of the air stream in discharge from the presently improved nozzle device, and the air stream composition of compressed air and aspirated atmospheric air attained through the nozzle, there is effected a very material reduction in the rate of compressed air consumption in cleaning operation of the nozzle device. Accordingly, the presently improved nozzle permits greater economy in the use of compressed air for object cleaning, than is possible with air systems heretofore generally employed wherein compressed air alone is utilized in relatively high speed, high pressure jet discharge from a small orificed nozzle.

It will be understood of course, that the air nozzle of this invention can be made in various sizes to accommodate different installations. Also, the number of passages 28 or the ratios between the area of the pipe section 16 at its orifice 29, the total area of the passages 28, and the area of the nozzle at the discharge orifice 32 may be varied to obtain varying discharge air jet characteristics. One successful nozzle installation on a ¼ inch compressed air line has a pipe section of ⅟₁₆ inch internal diameter, 7 slanted passages each of ⅟₁₆ inch diameter, and a nozzle discharge opening ⅟₁₆ inch in diameter.

From the foregoing description it will be seen that there is provided by this invention, a novel, efficient air nozzle which draws atmospheric air into the nozzle body to increase the volume of air discharged, and with a discharge pressure less than the pressure of the compressed air supply. This advantageous use of atmospheric air greatly reduces the amount of compressed air used for any cleaning job. Further, the reduced pressure air leaving the nozzle does not scatter dirt and chips as far as would occur with a high pressure jet, and consequently there is less danger to the face and eyes of the operator.

It will be understood that modifications and variations may be effected without departing from the scope of the novel concepts of the present invention.

I claim as my invention:

1. In combination with a compressed air supply control valve, an air nozzle device comprising a hollow nozzle member of generally frusto-conical configuration providing a discharge orifice at its smaller end and being internally threaded near its larger end, a body member threadedly received in the internally threaded larger end of the nozzle member and having a shank portion in removable, relatively close-coupled nozzle supporting attachment to the control valve, a tube secured centrally in said body member and shank portion and having one end in compressed air receiving communication with the control valve, the opposite end portion of the tube extending approximately half way into the interior of said hollow nozzle member with its terminal discharge end centrally therein, for directing compressed air to and through said nozzle orifice, and said body member having a plurality of passages therein radially outward of said tube, for atmospheric air admission to the interior of said nozzle member, said passages being inclined forwardly toward said nozzle discharge orifice with the longitudinal axes of the passages intersecting the longitudinal axis of said tube at a point near said terminal discharge end of the tube.

2. In combination with a compressed air supply control valve, an air nozzle device comprising a hollow nozzle member of generally frusto-conical configuration providing a discharge orifice at its smaller end and being internally threaded near its larger end, a body member threadedly received in the internally threaded larger end of the nozzle member and having a shank portion in removable, relatively close-coupled nozzle supporting attachment to the control valve, a tube secured centrally in said body member and shank portion and having one end in compressed air receiving communication with the control valve, the opposite end portion of the tube extending approximately half way into the interior of said hollow nozzle member with its terminal discharge end centrally therein, for directing compressed air to and through said nozzle orifice, and said body member having a plurality of passages therein substantially equi-angularly spaced radially outward of said tube, for atmospheric air admission to the interior of said nozzle member, said passages being inclined forwardly toward said nozzle discharge orifice with the longitudinal axes of the passages intersecting the longitudinal axis of said tube at a point thereof rearwardly adjacent said terminal discharge end of the tube.

THORVALD L. THORSEN.

References Cited in the file of this patent

UNITED STATES PATENTS

| Number | Name | Date |
|---|---|---|
| 391,865 | Schutte | Oct. 30, 1888 |
| 821,415 | Hess | May 22, 1906 |
| 823,278 | Hoxie | June 12, 1906 |
| 1,020,612 | Lawton | Mar. 19, 1912 |
| 1,613,795 | Herold | Jan. 11, 1927 |
| 2,052,622 | Hale | Sept. 1, 1936 |